Feb. 24, 1942.  L. D. ORMSBY  2,274,342
GAME APPARATUS
Filed Jan. 23, 1940
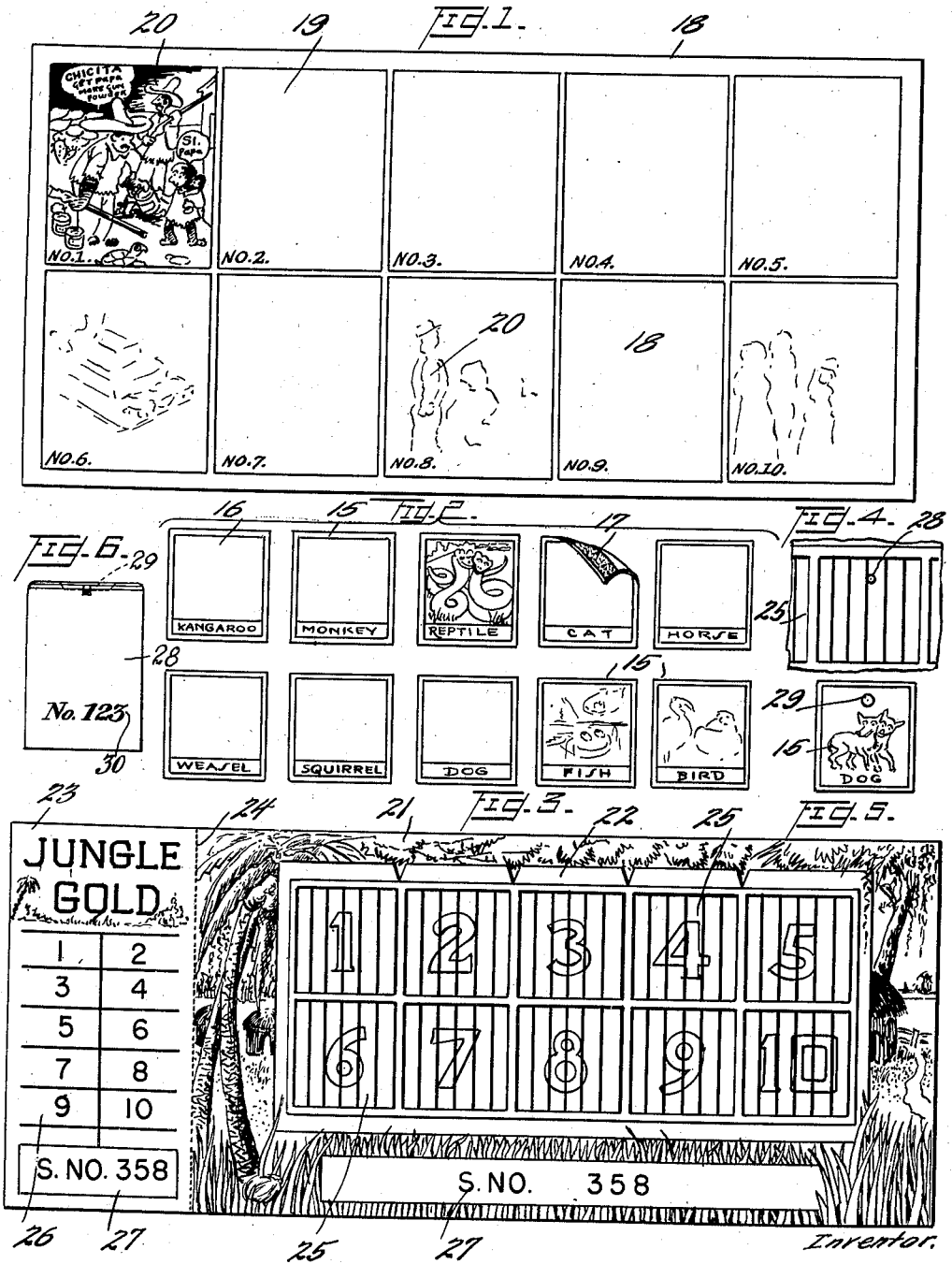
Inventor.
Leonard D. Ormsby
By Cushman Derby & Cushman
Attorneys Patented Feb. 24, 1942

2,274,342

UNITED STATES PATENT OFFICE 2,274,342

GAME APPARATUS

Leonard D. Ormsby, San Antonio, Tex.

Application January 23, 1940, Serial No. 315,237

2 Claims. (Cl. 273—1)

The present invention relates to a new and improved entertaining and educational game apparatus arranged to test the skill and ability of the players, and which may also be used as a sales stimulator or for advertising purposes.

The game may be played at parties or by various groups for their own entertainment and amusement. The game essentially consists of (1) a series of puzzle cartoon or coded instruction pieces, (2) a similar number of score cards, each having a detachable stub section, (3) a number of animal picture pieces or stamps, each of which preferably represents a different kind of animal, (4) a set of instructions, and (5) a sealed envelope containing the correct answers to the game. When used as a contest for stimulating sales or for advertising purposes, deposit boxes or receptacles are provided for collecting the answers.

For convenience in understanding the game, it might be mentioned that the whole animal kingdom is divided in the first place, into "phyla." Each phylum in turn consists of a number of classes, each class is divided into orders, each order into families, each family into genera, and each genus into species. In other words, any particular animal will belong to a certain species of a certain genus of a certain family of a certain order of a certain class of a certain phylum of the animal kingdom. The following animals have been selected for the purpose of illustration: monkey, weasel, squirrel, horse, dog, kangaroo, cat, bird, fish and reptile. The words "birds," "fish" and "reptile," respectively, are names of three classes of animals, while the others are names of families.

A particular puzzle cartoon upon being decoded and solved, will not necessarily indicate any one of the above animals, but it will indicate some animal which belongs to the bird class, fish class or reptile class of animals or belongs to one of the families. To illustrate, the clues in a particular puzzle cartoon may spell out "wren" and not "bird." However, since a wren is a member of the bird class, the contestant will put the bird stamp or piece in the appropriate place to show his answer to that puzzle cartoon. Likewise, clues in other cartoons may indicate a zebra. The point is that these clues may not lead to a horse but only to a zebra which is a member of the horse family. The contestant will indicate his solution by putting the horse stamp or piece in the appropriate place on the score card.

Referring to the drawing, in which is shown preferred embodiments of the invention:

Figure 1 is a front view of a cartoon strip or coded instruction sheet;

Figure 2 is a front view of separate stamped pieces;

Figure 3 is a front view of the score card;

Figure 4 is a detailed front view of a modified form of the cage shown in Figure 3;

Figure 5 is a front view of a stamp arranged to be detachably connected to the cage in Figure 4, and Figure 6 is a side view of a box or receptacle for receiving the stubs of the score cards.

Each game set may consist of a supply of animal picture pieces which preferably are in the form of separate paper stamps 15. As shown, each set represents 10 different kinds of animals, and each stamp 15 has printed or otherwise affixed to its outer surface or side 16, an animal picture and also the name of the animal family or class in which said animal belongs, so that each set of pieces may contain 10 different kinds of animals or inanimate objects. The inner surface or side or each stamp may be provided with an adhesive portion 17 such as glue, so as to attach the same to a member in the manner and for the purpose hereinafter to be described. Preferably, the supply of stamps in each master set are enclosed in several small envelopes or other containers to facilitate the distribution of the stamps in equal and suitable quantities at the beginning of the game. The animal families and classes represented on the individual stamp pieces 15 have been so selected that there will be no duplication of the initials of the names thereon so that the use of the initial of the particular name provides an easy method of recording the selection of stamps.

A suitable supply of puzzle cartoons or coded instruction cardboard strips 18, are each formed with separate spaces 19 numbered 1 to 10, inclusive, so as to correspond with the number of separate spaces 25 on the score card 21. Each of the spaces 19 has printed thereon data in the form of a puzzle cartoon 20 containing signs, conversation or coded instructions, which, when solved, gives a clue which, in some way, represents an animal of the particular animal family, or, in the case of fishes, birds and reptiles, a member of the particular animal class, on one of the stamps 15. Preferably, the cartoon strip pieces 18 are contained in a separate cover with the game set package, in order that the puzzles and the subject matter of the puzzles may be kept secret until the beginning of the game. The spaces 19 each contains a different cartoon or data which, when solved, is represented by an animal of the particular animal family, or, in the case of fishes, birds and reptiles, a member of the particular animal class on one of the stamp pieces 15. The cartoons are so constructed as to be reasonably difficult to solve at a social gathering where only a short time should be spent on working out each puzzle. The data in the spaces 19 is so arranged that there is only one answer to each puzzle cartoon piece.

The game has associated therewith a score card or recording means 21 of any suitable material such as cardboard or the like, and includes a body portion 22, and a stub portion 23 connected to the body portion by a transverse perforated line 24, so as to be detachable therefrom. The body portion 22 is provided with separate spaces or cages 25 numbered 1 to 10 inclusive, to correspond with the number of the spaces 19 on the cartoon strip 18. The detachable stub piece 23 is similarly formed with separate spaces 26 equal in number to the number of spaces on the body portion 22 and consecutively numbered 1 to 10, inclusive. The score card 21 constitutes a card element for receiving the individual picture pieces or stamps 15 so that they are assembled in the spaces 25 in the same sequential order as the cartoons are arranged on the strip 18. Additionally, the body portion 22 and stub portion 23 contain a duplicate serial number or mark 27, so that the stub portion 23 associated with the body 21 may be readily identified when detached. The stamp pieces 15 are of such size and shape as to fit in each of the spaces or cages 25 and may be secured thereto by the adhesive means 17 on the rear face of each stamp. The recording means it will be seen includes a main member 22 and an auxiliary member 23.

In order to stimulate interest and impart intriguing humor to the solution of the game, it has been designated "Jungle gold," the idea being that a great jungle circus has published puzzle cartoons, each of which represents an animal the circus is desirous of adding to its collection. Accordingly, the circus has offered an attractive prize to the one who will supply the proper animals placed in the right cages. The players each assumes the role of a jungle hunter and through skill and imagination and a knowledge of natural history, they attempt to decode or interpret the ten different puzzle cartoons represented in the spaces 19 of the strips 18, and supply the proper animals to the circus in competition with each other by placing the proper animal picture stamp pieces 15 in the correct space or cage 25 of the score card 21.

The detachable stub pieces 23 constitute a "Bill of lading" on which is recorded in the spaces 26 the names or initials of the animal pieces 15, placed in each of the spaces 25 of the main body 22, so as to constitute the player's record of an imaginary shipment made to the circus. Since the animal names on the stamp pieces 15 have been selected so there will be no duplication of their initials, the initials may be used as an easy method of recording the player's selection in the spaces 26.

The game is played as follows:

Some one person acts as the leader or operator, while all the others are contestants. The leader first reads the rules of the game, so that all players may fully understand the procedure. He then gives to each one of the contestants a cartoon strip 18 and also one set of ten animal stamp pieces 15 and a score card 21.

Each player solves the puzzle cartoons to the best of his ability. When he has solved the puzzle, he selects from the supply of animal picture stamp pieces 15 that piece which in his opinion, represents the family or class of animals indicated by the data in the particular puzzle space 18.

Assuming that after studying the cartoon 20 in the space 1, the player concludes the turtle shown therein gives the correct clue that the stamp containing a reptile is the proper one to designate this cartoon, he thereupon attaches the stamp piece showing the "reptile" to the space 25 marked No. 1 and at the same time may apply the letter "R" to the space 26 marked No. 1 on the stub 23, so as to indicate a record of his answer to the puzzle contained in this cartoon. He then proceeds to solve the remaining cartoons on the sheet 18 until he has arranged the ten stamp pieces on the cages of the score card and has entered in the spaces 26 the initials of the animal stamp pieces, as they appear in their corresponding spaces 25 on the score card. After he has completed his entry, the player detaches the stub 23 which he keeps as his record of his solution of the cartoons on the strip 18. The player then deposits the body portion 22 of the score card in a container provided for this purpose. When all the players have finished, or when a predetermined time has expired, which may have been agreed upon, the leader or operator calls for all the remaining entries and deposits them in the proper container. The leader then opens the envelope containing the correct answers and announces the proper arrangement of the stamp pieces as they should appear on the body of the score card 22 and on the stub portion 23 corresponding to the body portion. The player who finds that he has deposited a card or has made a shipment bearing the proper arrangement of stamps, presents his "bill of lading" 23 and claims himself to be the winner or the seller who has won the sale and the prize. Since the stub portion 23 has the same serial number as its complementary body portion 22, it is merely necessary for him to present his stub portion to see if the answers thereon are arranged in the same order as on his body portion 22 of the score card, and if so, he is declared to be the winner. Thus, it will be seen that each player is his own judge and must notify the leader or operator if he has deposited a correct solution. The number of stamp pieces, tokens, or materials 15 may vary from ten and may be of any number desired. The number of spaces in the cartoon strips 18, as well as the spaces in the main body portion 22 and the stub portion 23 of the score sheet, may be the same as the number of stamps in each set, or there may be more kinds of animal picture pieces or stamps 15 than spaces on the score card 21 in order to make it more difficult for contestants to solve correctly the puzzle cartoons because there will be more animal stamps to choose from.

Instead of adhesively attaching the pieces 15 to the score card, these pieces may be detachably connected to each of the spaces or cages 25 in any other suitable manner such as by providing each of the cages 25 with medially and outwardly projecting flexible metal tabs 28 or McGill fasteners, arranged to extend through complementary openings 29 in each of the pieces 15 and be bent in overlapping relation to the outer surface of the pieces to secure the same to the score board. The stamps 15, strip 18 and score card 21 are preferably made of paper or cardboard. However, it will be manifest that these parts may be formed of metal, wood or other fibrous material, so as to be capable of withstanding the uses to which they are subjected in handling. Moreover, while the cartoon pieces 20 are shown printed on a sheet 18, these cartoons may be formed in separate pieces so as to be selected from a suitable container by the player during the progress of the game. The stamps 15 may, if desired, be arranged in sets of ten and attached to a suitable supporting strip or base so as to be readily removed therefrom and be connected to the cages 25 of the score card.

The master set or package containing a complete supply of materials for one game is preferably packed in an attractive pasteboard box for preserving the materials in good condition and which may be decorated appropriately to enhance the appeal of the game. Each set of master boxes may also bear an identifying code mark which indicates the group of puzzle cartoons contained in each set, so that like or unlike sets may be selected at will and without it being necessary to inspect the puzzles themselves.

The game may also be used as a contest to stimulate sales or for advertising purposes. When used for such purposes, it will be merely necessary to provide a suitable number of deposit boxes or receptacles 28 and locate each of these boxes at convenient points in stores or buildings throughout the city or a certain area. Each of these boxes has an opening 29 and is distinctively or consecutively numbered or marked as at 30 and is arranged to receive the body portions 22 of the score cards when the stubs are detached therefrom after the contestants have completed the game. Assuming that the game is used for advertising purposes, the manufacturer or distributor of a commercial product may distribute to the public, or contestants, the animal stamps 15, cartoons 18, and the score cards 21, with the understanding that a prize will be awarded to the ones who submit the correct answers. Instead of having the contestants mail or send their score cards to a central office, or to a particular place, it will merely be necessary for each constant, after he has solved the cartoons, to deposit the body 22 of his score card into one of the boxes or receptacles 28, and to indicate on the stub portion 23 of his score card the number of the box or receptacle in which he deposited his score card. When the correct answers to the picture cartoons have been published, each contestant checks his stub 23 to see whether he submitted the proper answers. If a contestant's stub shows that he turned in a perfect score, he promptly notifies the proper authority or operator, giving him the number of his score card and the number of the box or receptacle in which he deposited the correct answers. Assuming that there are one hundred such deposit boxes scattered at various points, and that a large number of participants enter the contest, and further that only one contestant reports a perfect score card, in such a case the proper authority or operator is directed by the contestant to the particular box in which the body portion 22 of his score card has been deposited. The operator can then quickly, and at a minimum expense of time, verify whether the contestant submitted a correct answer, and thus avoid the necessity of examining the other ninety-nine boxes. The score cards which do not contain the correct answers can be removed from the receptacles and destroyed after the time prescribed for solving the game or contest has expired. Thus it will be seen that simple, inexpensive, and efficient means are provided for conducting the game. Further, as each contestant is the only one who checks to see whether he has submitted the correct answers, it will not be necessary to collect or examine all the answers turned in, or keep a record of these, since the correct answer, or answers, may be immediately located.

It will be observed that any number of players or contestants may participate in the game. Moreover, at social gatherings the leader or operator may also play, since all the answers to the puzzle cartoons are preferably enclosed in sealed envelopes.

It will be manifest that the game is capable of certain modifying adaptations which do not alter the essential objects of the game and that the stamps 15 may represent different kinds, classes, or groups of animate or inanimate objects or tokens, so as to be used to test the skill and furnish entertainment to the players. Each master set contains a sufficient number of picture pieces, cartoon strips, and score cards as is necessary to provide the whole supply of material for the number of players. By the term "numbered" as used in the specification and claims is meant any consecutive marking, whether numbers or letters.

When the puzzle cartons 19 are supplied on single card pieces, they may be drawn from a suitable container, and the player upon completing the solving of one piece and attaching it to the corresponding space on the score card 25 then draws a new puzzle piece and continues until he has finished the game or the time allotted has expired. To increase the interest and enjoyment of the game, the puzzles may have different credit values according to the difficulty involved in their solution.

It is to be understood that the forms of the invention shown and described are merely illustrative and that such changes may be made as fall within the purview of one skilled in the art without departing from the spirit of the invention and the scope of the appended claims.

I claim:

1. A game or contest of the class described including in combination, a set of picture pieces having different objects identified thereon, a series of consecutively numbered puzzle cartoons, each of said cartoons containing indicia or a clue which when solved designates the object on one of the picture pieces, a card element having a detachable portion, said card element and detachable portion each having consecutively numbered portions corresponding in number to the number of cartoons, and means for individually attaching the picture pieces to the numbered portions on the card element in sequential order corresponding to the sequence of the puzzle cartoons, the numbered portions of said detachable portion arranged to have indicated thereon the arrangement of the picture pieces in the same order that the latter are positioned on the card element, the arrangement of the picture pieces on the card element indicating the player's solution of the puzzles depicted by the cartoons, and the detachable portion of the card element constituting means whereby each player or contestant determines the correctness of the player's solution of the puzzles depicted by the cartoons, said card element and said detachable portion each having a space for receiving a duplicate mark correspondingly identifying the same.

2. A game or contest of the class described including in combination, a set of picture pieces having different objects identified thereon, a series of consecutively numbered puzzle cartoons, each of said cartoons containing indicia or a clue which when solved designates the object on one of the picture pieces, a card element having a detachable portion, said card element and detachable portion each having consecutively numbered portions corresponding in number to the number of cartoons, and means for individually attaching the picture pieces to the numbered portions on the card element in sequential order corresponding to the sequence of the puzzle cartoons, the numbered portions of said detachable portion arranged to have indicated thereon the arrangement of the picture pieces in the same order that the latter are positioned on the card element, the arrangement of the picture pieces on the card element indicating the player's solution of the puzzles depicted by the cartoons, and the detachable portion of the card element constituting means whereby each player or contestant determines the correctness of the player's solution of the puzzles depicted by the cartoons, said card element and said detachable portion each having a duplicate mark correspondingly identifying the same.

LEONARD D. ORMSBY.